United States Patent
Cho et al.

(10) Patent No.: US 6,288,759 B1
(45) Date of Patent: Sep. 11, 2001

(54) DISPLAY DEVICE HAVING FIRE-RETARDANT SHIELD CASE

(75) Inventors: Nam-il Cho; Kwang-moon Choi; Tae-hwan Kim; Gwang-hyeon Kim, all of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/165,298

(22) Filed: Oct. 2, 1998

(30) Foreign Application Priority Data

| Oct. 2, 1997 | (KR) | ................................................ 97-50853 |
| Mar. 2, 1998 | (KR) | ................................................ 98-4163 |
| Mar. 20, 1998 | (KR) | ................................................ 98-4164 |
| Jun. 26, 1998 | (KR) | ................................................ 98-24292 |

(51) Int. Cl.[7] ..................................................... H04N 5/64
(52) U.S. Cl. ........................ 348/836; 312/7.2; 312/223.2; 312/409
(58) Field of Search .................................... 348/836, 837, 348/838, 841, 843; 312/7.2, 223.1, 223.2, 409; 361/682, 683, 724, 725, 726, 681

(56) References Cited

U.S. PATENT DOCUMENTS

| 4,508,640 | * | 4/1985 | Kanda et al. . |
| 4,596,670 | * | 6/1986 | Liu . |
| 4,643,493 | * | 2/1987 | Sides, Sr. et al. ............... 348/836 X |
| 4,704,413 | * | 11/1987 | Nabeta et al. . |
| 5,295,046 | * | 3/1994 | Knauber et al. . |
| 5,366,664 | * | 11/1994 | Varadan et al. . |
| 5,691,781 | * | 11/1997 | Siccardo ........................... 348/223.2 X |
| 5,742,359 | * | 4/1998 | Han ................................ 312/223.2 X |
| 5,806,970 | * | 9/1998 | Giorgianni et al. ............. 348/836 X |
| 5,969,776 | * | 10/1999 | Han ...................................... 348/836 |
| 5,973,916 | * | 10/1999 | Han ................................. 348/836 X |
| 5,990,985 | * | 11/1999 | Kim ..................................... 348/836 |
| 6,008,581 | * | 12/1999 | Ochiai et al. . |

* cited by examiner

*Primary Examiner*—Peter R. Brown
*Assistant Examiner*—Hanh V. Tran
(74) *Attorney, Agent, or Firm*—Staas & Halsey LLP (57) ABSTRACT

A display device includes a front case; a cathode ray tube mounted on the front case; a main circuit board mounted on the rear side of the cathode ray tube; a circuit board frame, mounted to one among the front case and the cathode ray tube, to support the circuit board; a nonflammable and fire-retardant shield case to contain a fire that may break out in the interior of the display device, while providing a shielding effect which minimizes the radiation of electromagnetic waves generated by the display device and protects the display device from external electromagnetic interference; and a rear case that is combined with the front case to encase the interior of the display device. A top surface of the shield case includes an anode cap shield which protrudes upwardly from the surface to a fixed height to form openings on either side of an anode cap shield. A nonflammable and fireproof plate member having sides which block the openings formed by the anode cap shield is installed under a top plate of the shield case. Thus, the front and rear cases are made of a non-fireproof material, yet UL fire safety requirements are met.

36 Claims, 11 Drawing Sheets

DISPLAY DEVICE HAVING FIRE-RETARDANT SHIELD CASE

CROSS-REFERENCE TO RELATED APPLICATIONS

This application makes reference to, incorporates the same herein, and claims all benefits accruing under 35 U.S.C. §119 from Korean Patent Application No. P97-50853, filed on Oct. 2, 1997 and entitled Display Apparatus with a Double Cabinet Structure, Korean Utility Model Application No. 98-4163, filed on Mar. 30, 1998 and entitled Display Apparatus Having an Anode Cover for Fire Protection, Korean Utility Model Application No. 98-4164, filed on Mar. 20, 1998 and entitled Shield Device for Video PCB Having a Cap Portion, and Korean Patent Application No. 98-24292, filed on Jun. 26, 1998 and entitled A Display Device Having a Cabinet for Preventing Fire, all filed with the Korean Industrial Property Office.

BACKGROUND OF THE INVENTION

1. Field of the Invention

The present invention relates to a CRT-type display device, and more particularly, to a display device having a shield case (inner cabinet) which provides shielding against electromagnetic interference (EMI) and contains a fire which may break out in the interior of the shield case (inner cabinet).

2. Description of the Related Art

Figure 1:
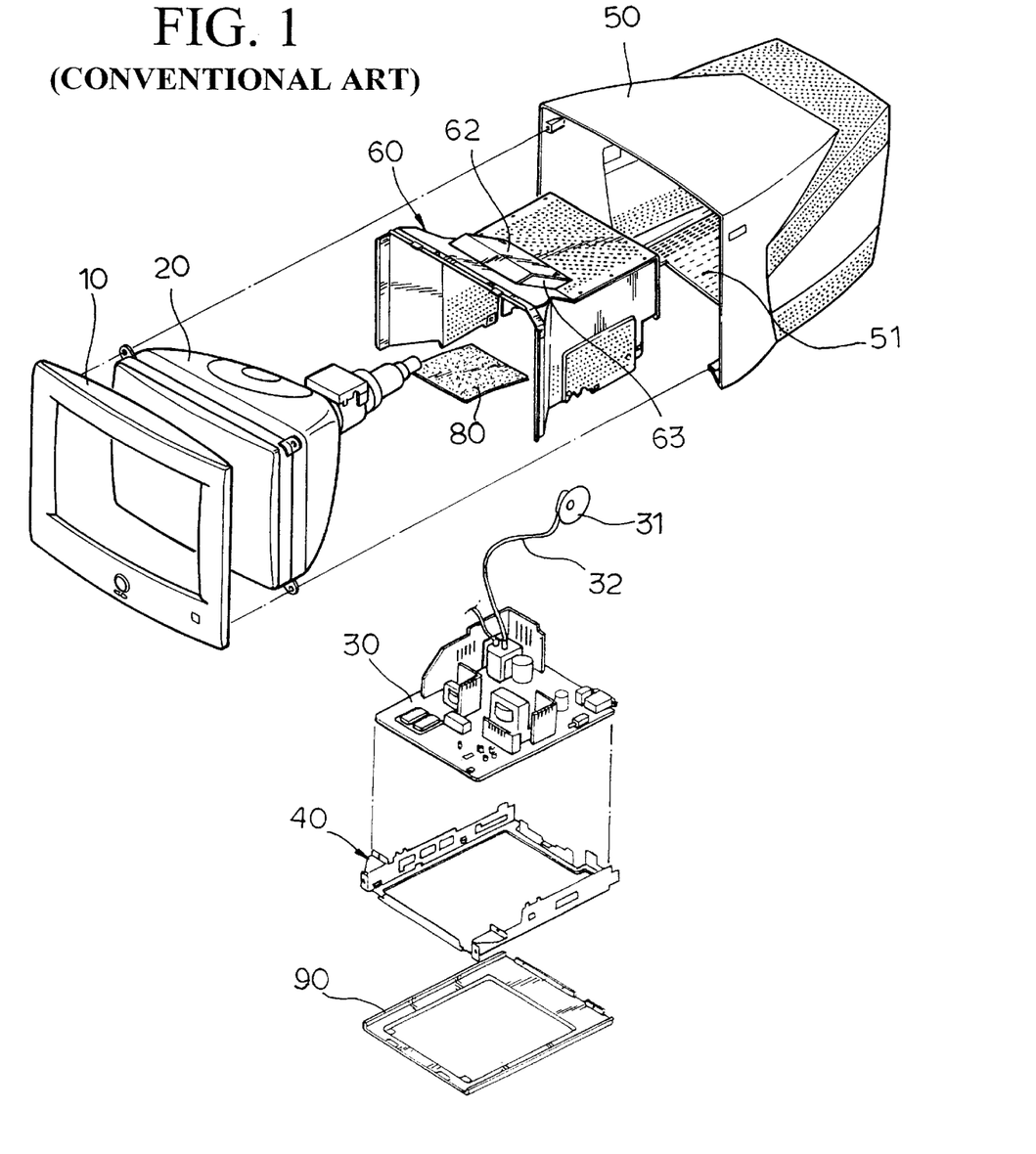
FIG. 1 is a disassembled perspective view of a contemporary CRT-type display device.

Referring to FIG. 1, a typical CRT-type display device is largely comprised of: a cathode ray tube (CRT) 20 by which an image is displayed according to a display signal transmitted along with an electric energy; a circuit board 30 mounted on the rear side of the CRT 20, to control electrical power, the display signal and related circuitry; a front case 10 to which the CRT 20 is mounted; and a rear case 50 which is combined with the front case 10 to encase the interior of the display device. The circuit board 30 is mounted on a circuit board frame 40 which is secured to the front case 10 or the CRT 20. A bottom frame 90 is mounted to the bottom of the circuit board frame 40, and a stand (not shown) is generally provided under the bottom frame 90 for support of the entire display device.

In order to provide EMI shielding for such a display device, a shield case 60 is attached to the rear of the CRT 20 and the top of the circuit board 30 to thereby cover these areas and thus minimize the radiation of electromagnetic waves generated by the display device as well as to protect the display device from external electromagnetic interference. As a rule, display devices having screens smaller than fourteen inches do not employ this shielding.

Figure 2A:
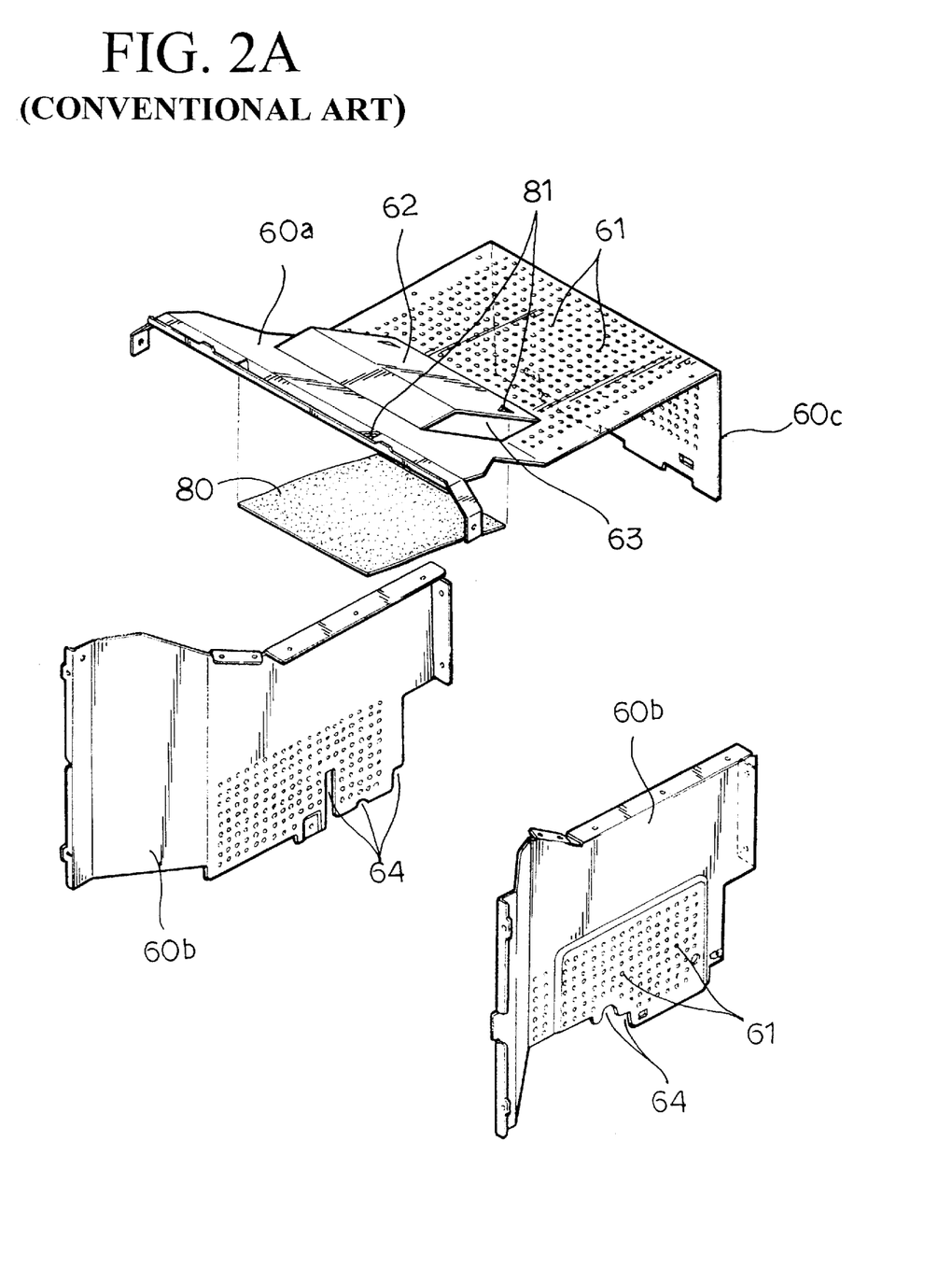
FIGS. 2A and 2B are disassembled and assembled perspective views, respectively, of a shield case of the contemporary CRT-type display device shown in FIG. 1.
Figure 2B:
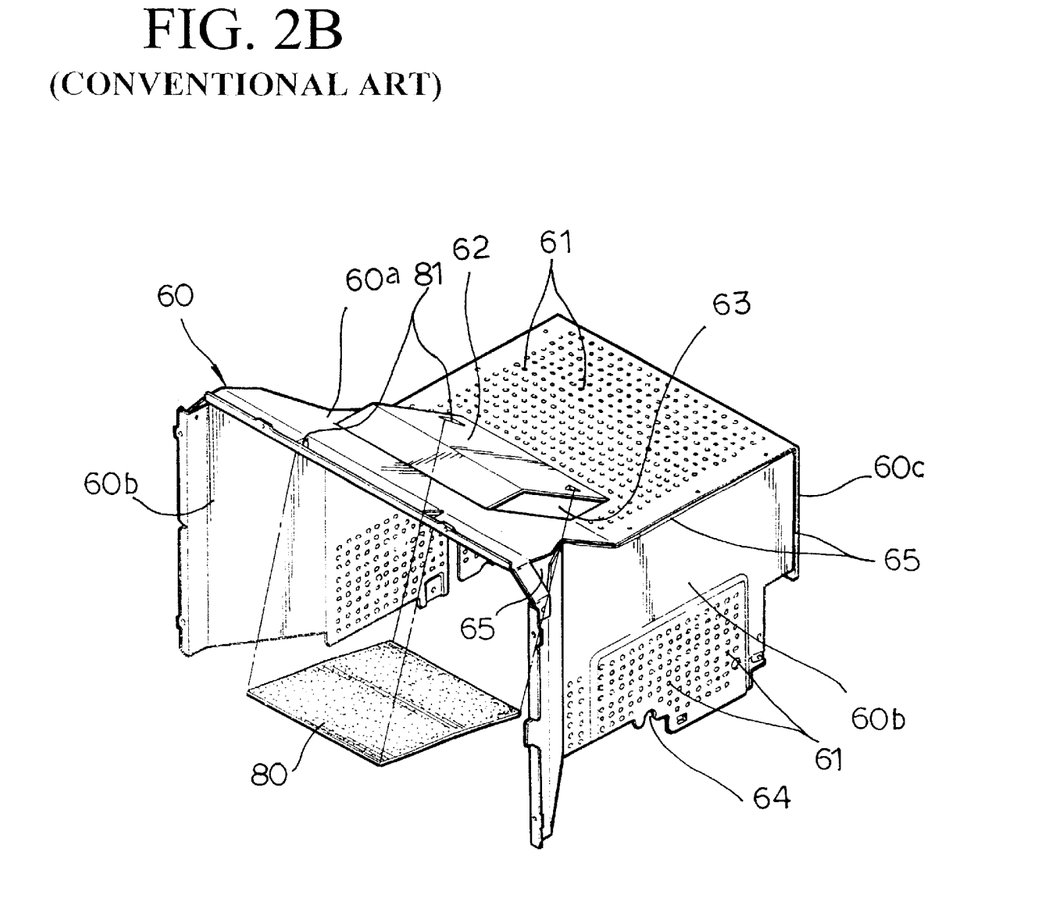

As shown in FIGS. 2A and 2B, the shield case 60 is formed of a top plate 60a, a pair of lateral plates 60b formed on two sides of the top plate 60a, and a rear plate 60c forming the rear surface of the top plate 60a. The shield case 60 is generally cut out of a flat piece of sheet metal to form panel-like sections and then stamped into the desired shape. Therefore, when assembled, the shield case 60 tends to have gaps 65 where the respective plates meet and where complete enclosure is considered unnecessary since the shield case 60 is primarily for EMI shielding purposes only. A plurality of cooling holes 61 are formed throughout many surfaces of the shield case 60 at predetermined locations, to reduce weight and to allow air to circulate within the interior of the shield case 60, while maintaining adequate shielding effects.

As a significant feature of the shield case 60, an anode cap shield 62 is provided in a surface of the top plate 60a and protrudes upwardly from the surface to a fixed height determined by the presence of an anode cable 32 connecting an anode cap 31 through which high voltage passes to the circuit board 30 to the CRT 20. Since there is a potential for electrical contact between the anode cap shield 62 and the high-voltage components, an insulating sheet 80 may be installed using notched slots 81 on the underside of the anode cap shield 62 to promote safety.

The anode cap shield 62 is formed of a separately cut and stamped panel attached to the top plate 60a, resulting in the formation of openings 63 on either side thereof. Even though the openings 63 may be large and a measurable degree of electromagnetic emission escapes through the openings, the shield case 60 can still meet the prescribed shielding requirements.

The entire assembly shown in FIG. 2B is fixed to adjacent coupling components, e.g., the CRT 20 or CRT bracket (not shown) and the circuit board frame 40, using coupling means such as a hook and groove structure or sheet metal screws. In so coupling, many open portions 64 are present due to weight reduction goals and component access considerations.

Although EMI requirements are met by installing the shielding case 60 constructed as above in a CRT-type display device, in order to meet fire safety standards such as those set by Underwriter's Laboratories (UL) (e.g., UL Standard 1418 (1992), Standard for Safety for Cathode Ray Tubes), the rear case 50, and sometimes the front case 10, must be manufactured from fireproof material. That is, if a fire should break out within the interior of the display device, the shielding case 60 offers no protection from the possibility that the fire should spread outward from the device and into the surrounding room. Thus, the rear case 50 should be designed to contain an accidental fire.

In manufacturing and adopting cases made of fireproof material, there is no particular structural problem. However, there is a drawback in that the case, being made of fireproof material, is costly. Besides fireproof material, UL safety requirements stipulate additional measures, for example, the size, shape, position and number of outer cabinet cooling holes. It should therefore be appreciated that when UL requirements are placed on the design of the case, which constitutes the overall appearance of the product, the fundamental design of the entire product, as it appears to the consumer, is restricted.

In addition, the extensive use of fireproof material presents an environmental hazard and is a continual draw on natural resources.

SUMMARY OF THE INVENTION

Accordingly, in order to overcome such drawbacks in the conventional art, it is therefore an object of the present invention to provide a display device in which a shielding case material itself meets fire safety requirements in addition to providing EMI shielding.

It is another object of the present invention to provide a display device having a reduced fabrication cost.

It is yet another object of the present invention to provide a display device in which the outer case design is not restricted by fire safety requirements.

It is still another object of the present invention to provide a display device which promotes environmental concerns.

Additional objects and advantages of the invention will be set forth in part in the description which follows and, in part, will be obvious from the description, or may be learned by practice of the invention.

To achieve these objects and other advantages and in accordance with the purpose of the present invention, as embodied and broadly described, there is provided a display device including: a front case; a cathode ray tube mounted on the front case; a main circuit board mounted on the rear side of the cathode ray tube; a circuit board frame, mounted to one of the front case and the cathode ray tube, to support the circuit board; a nonflammable and fire-retardant shield case (inner cabinet) to contain a fire that may break out in the interior of the display device, while providing a shielding effect which minimizes the radiation of electromagnetic waves generated by the display device and protects the display device from external electromagnetic interference; and a rear case that is combined with the front case to encase the interior of the display device.

As a characteristic feature of the present invention, the front and rear cases are made of non-fireproof plastic, yet a display device which meets UL fire safety requirements is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF THE PREFERRED EMBODIMENTS

Figure 3:
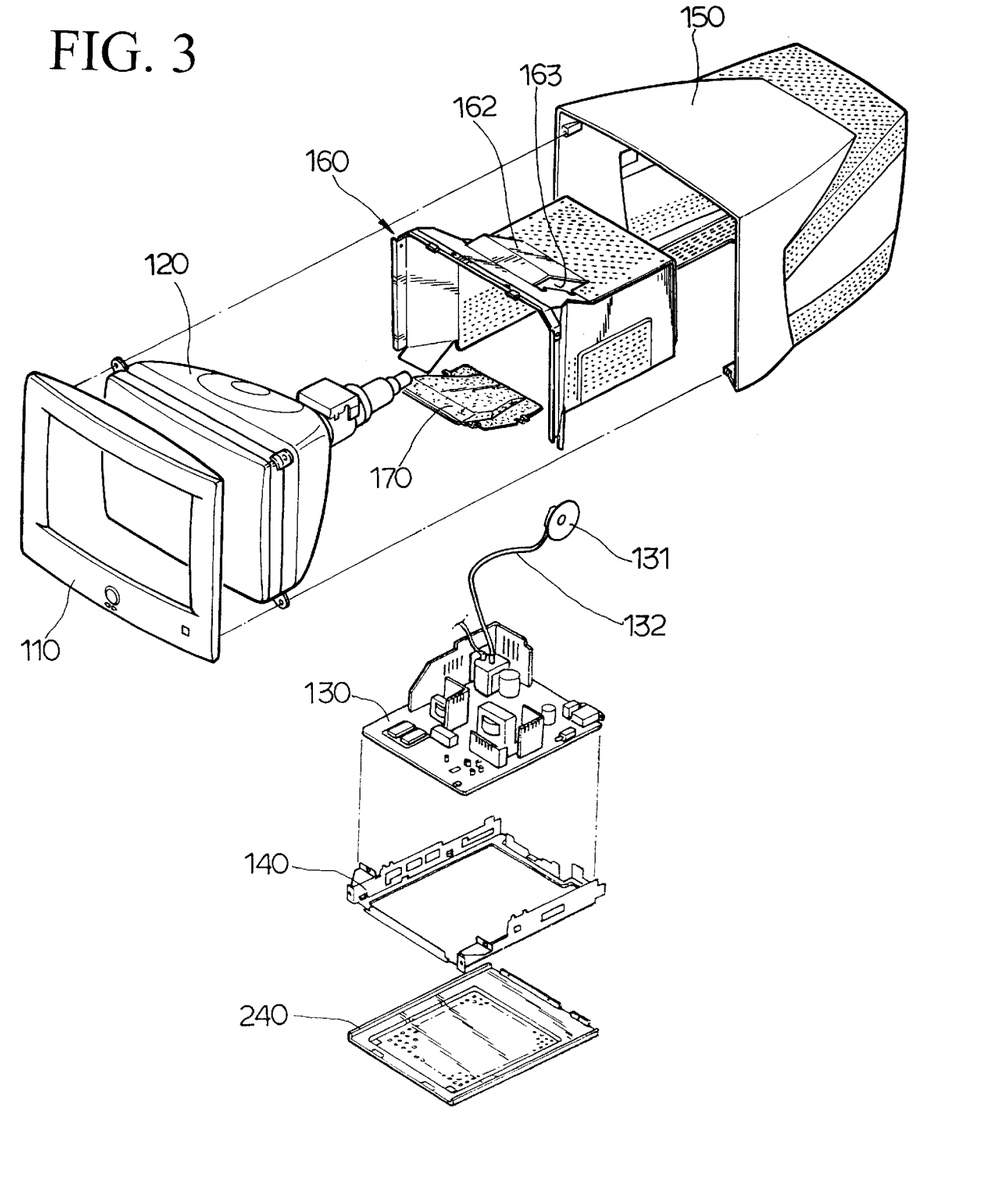
FIG. 3 is a disassembled perspective view of a CRT-type display device according to a first embodiment of the present invention.

Referring to FIG. 3, a CRT-type display device according to the first embodiment of the present invention includes a front case 110; a CRT 120 mounted to the front case; a circuit board 130 mounted on the rear side of the CRT 120, to control electrical power, the display signal and related circuitry; a circuit board frame 140, which is secured to the front case 110 or the CRT 120, on which the circuit board 130 is installed; a shield case 160, which is a nonflammable and fire-retardant cabinet, which contains a fire that may break out in the interior of the display device, e.g., on or near the circuit board 130 or the rear side of the CRT 120, while providing EMI shielding which minimizes the radiation of electromagnetic waves generated by the display device and protects the display device from external electromagnetic interference; and a rear case 150 which is combined with the front case 110 to encase the interior of the display device. A bottom frame 240 is mounted to the bottom of the circuit board frame 140, and a stand (not shown) is generally provided under the bottom frame for support of the entire display device.

The shield case 160 is attached to the rear of the CRT 120 and the top of the circuit board 130 to thereby cover these areas and thus minimize the radiation of electromagnetic waves generated by the display device as well as to protect the display device from external electromagnetic interference.

Figure 4:
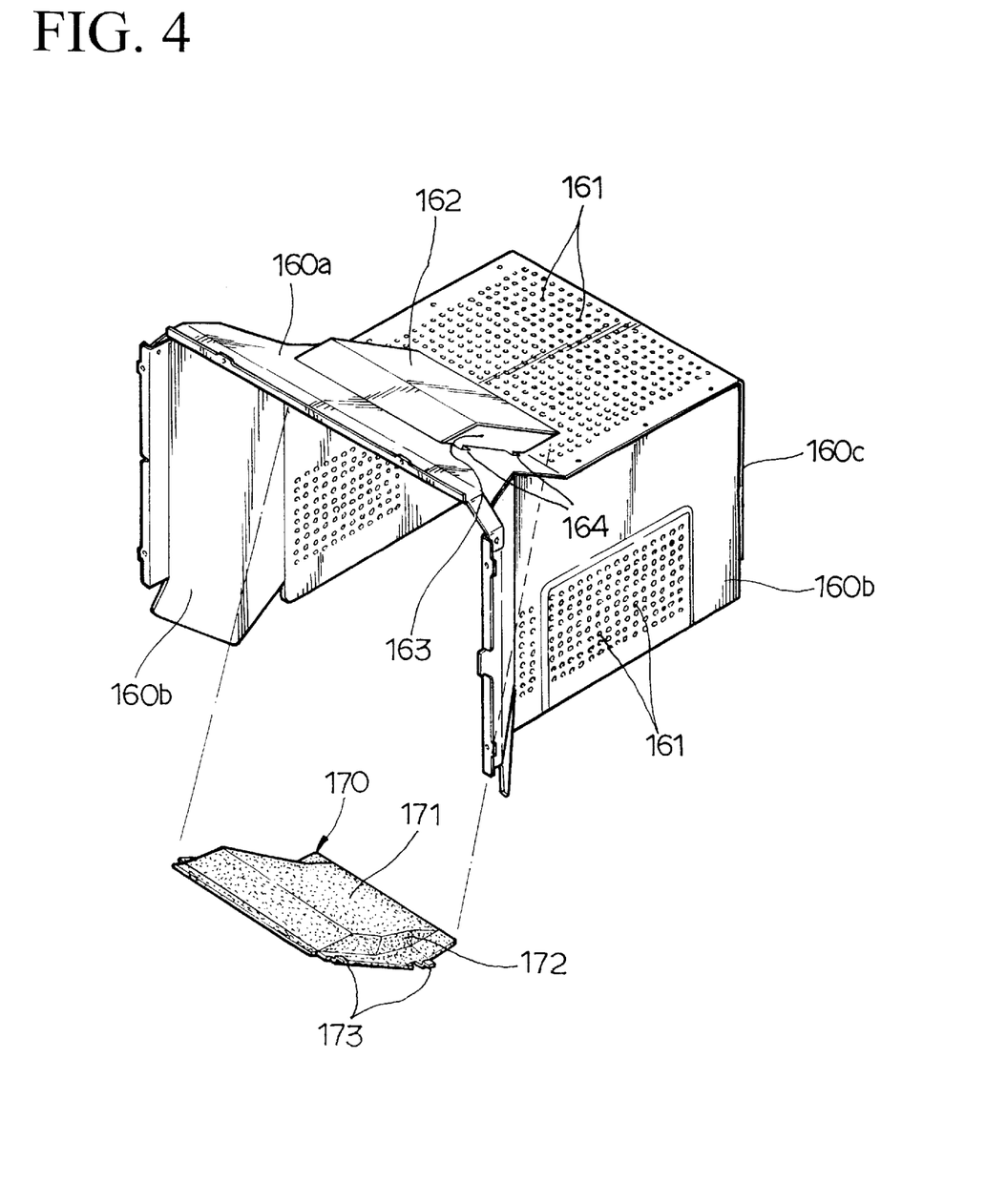
FIG. 4 is a perspective view a nonflammable and fire-retardant shield case according to the first embodiment of the present invention.

As shown in FIG. 4, the shield case 160 is formed of a top plate 160a, a pair of lateral plates 160b formed on two sides of the top plate 160a, and a rear plate 160c forming the rear surface of the top plate 160a. As in the conventional art, the shield case 160 is cut out of a flat piece of sheet metal to form panel-like sections and then stamped into the desired shape. A plurality of cooling holes 161 are formed throughout many surfaces of the shield case 160 at predetermined locations, to reduce weight as well as to allow air to circulate within the interior of the shield case 160, while maintaining adequate shielding effects.

An anode cap shield 162 is provided in a surface of the top plate 160a and protrudes upwardly from the surface to a fixed height as determined by the presence of an anode cable 132 connecting an anode cap 131 through which high voltage passes to the circuit board 130 to the CRT 120. The anode cap shield 162 is formed of a separately cut and stamped panel attached to the top plate 160a, so that openings 163 are present on two sides thereof.

As the openings 163 are larger than allowed by UL safety requirements, the present invention embodies means for closing off these openings, i.e., a plate member 170, which is inserted inside the anode cap shield 162. The plate member 170 is made of a nonflammable and fireproof material formed to have a top 171 and sides 172 and is provided with keepers 173 for catching on grooves 164 formed in the top plate 160a of the cabinet 160. By inserting the plate member 170 into the grooves 164, the plate member 170 is installed under the anode cap shield 162 and thereby combines with the shield case 160 to close off the openings 163. That is, the top 171 of the plate member 170 is seated within the lower surface of the anode cap shield 162 and the sides 172 thereof completely block the openings 163. Thus, as the sides 172 of the plate member 170 block the openings 163 of the anode cap shield 162, should an accidental fire break out, the flame is intercepted so that the fire does not spread and is fully contained within the shield case 160. Also, since the plate member 170 is made of a fireproof plastic material, which is an insulating material, it also serves as insulation between the anode cable 132 and the anode cap shield 162.

Figure 5:
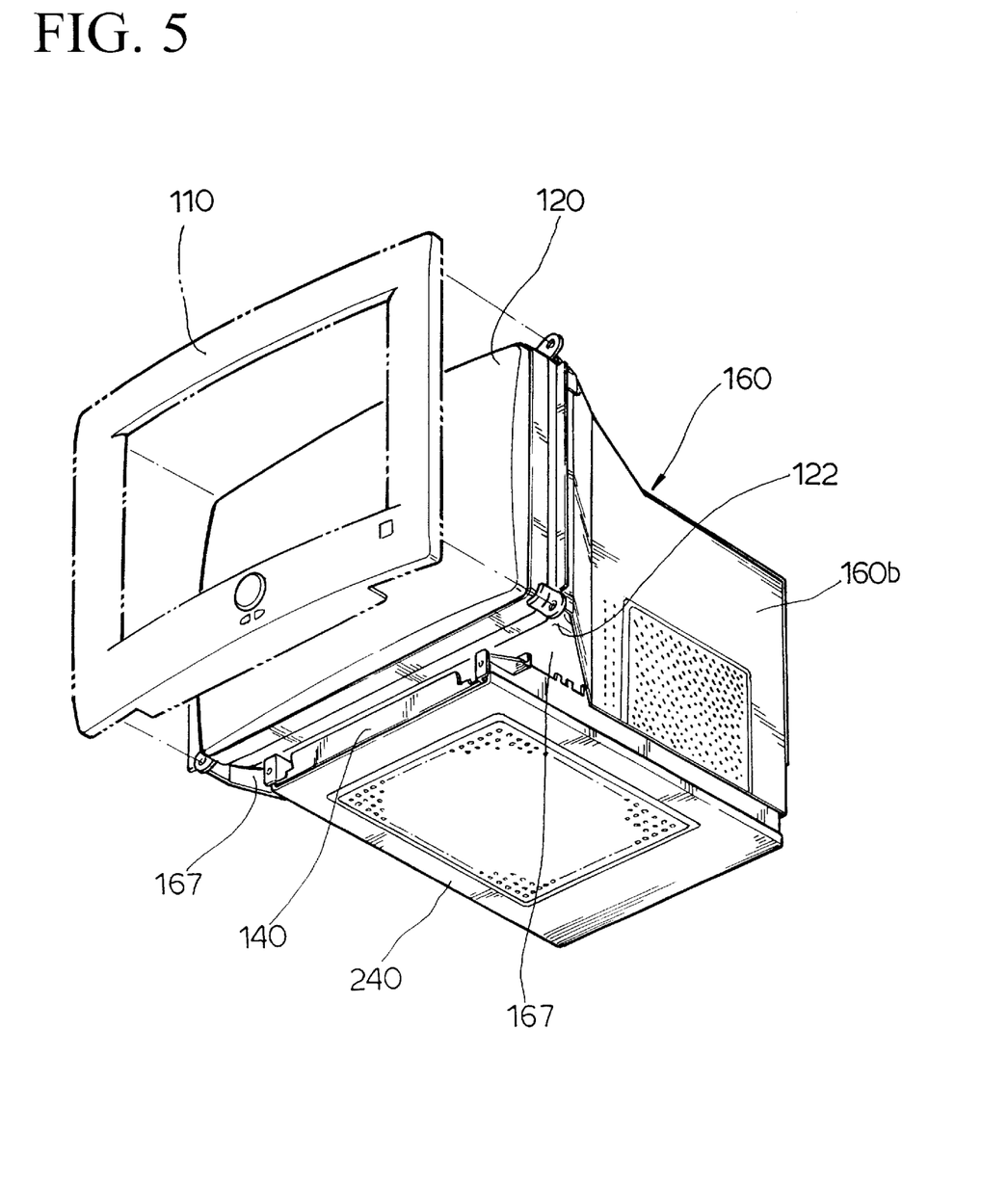
FIG. 5 is a perspective view showing the lower portion of a display device according to the first embodiment of the present invention.

Meanwhile, in order to keep in check the spread of a flame out through the bottom of the circuit board 130, in the first embodiment of the present invention, the bottom frame 240 is full-paneled and attached to the circuit board frame 140, as shown in FIG. 5. Here, though open spaces 167 are present, the exposed components, mainly a CRT bulb 122 which is made of glass, do not present a fire hazard. It should be appreciated that the shield case 160 of the first embodiment of the present invention, when mounted to its adjacent coupling components, is designed to meet UL requirements by enclosing the open portions 64 and gaps 65 of the conventional art. Thus, by employing the bottom frame 240 according to the present invention, the rear case 150 does not need to fully encase the bottom of the display device using a lower panel 51 as in the conventional art (see FIG. 1).

As a result, the shield case 160 has a function which controls and contains an accidental fire. Therefore, the outside case of the display device, which includes the front and rear cases 110 and 150, may be made of a material other than fireproof material. That is, the front and rear cases 110 and 150, which constitute the exterior of the product according to this invention, may be fabricated of many materials other than an expensive fireproof plastic. As an example of an inexpensive non-fireproof plastic material, HB class material of the UL standard is appropriate.

Figure 6:
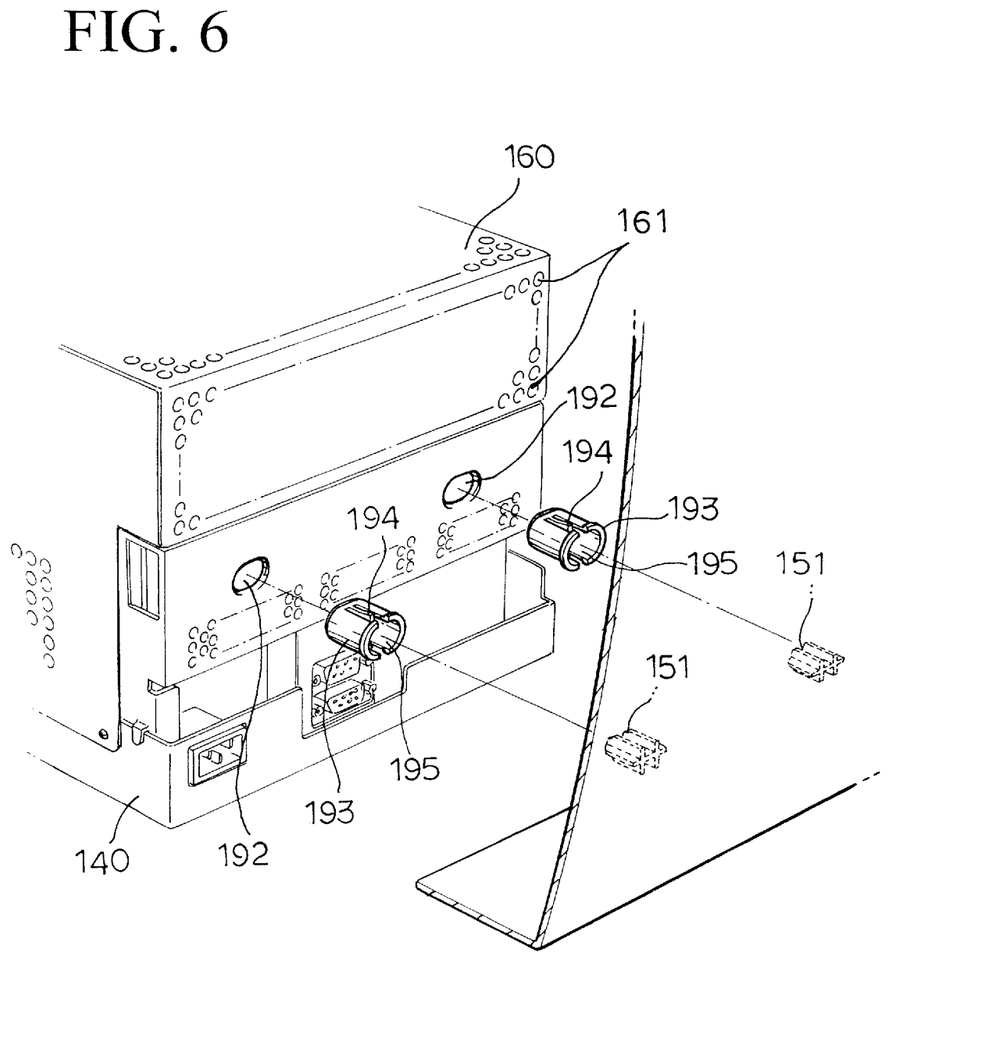
FIG. 6 is a perspective view showing a technique for mounting a rear case to the cabinet of a display device according to the first embodiment of the present invention.

Referring to FIG. 6, in order to mount the rear case 150 to any portion of the shield case 160, mounting holes 192 may be provided within a surface of the shield case 160, which may be larger than allowed by the UL safety requirements. These mounting holes 192 are formed so as to correspond to protrusions 151 formed on the inner surface of the rear case 150, which are inserted into the mounting holes 192. The mounting holes 192 cannot be made small enough to meet UL requirements and thereby contain a fire, since to do so would mean the protrusions 151 would need to be so narrow that they count not provide adequate support for the rear case 150. To shield the material of the rear case 150, which may be made of non-fireproof material, caps 193 are made of a nonflammable or fire-retardant material such as that of the plate member 170. The caps 193, being provided with hooks 194 for catching inner lips of the shield case 160 material, are inserted firmly into receptacles 195 of the mounting holes 192. Thus, a wide range of mounting needs can be met for mounting the front and rear cases 110 and 150, while maintaining fire safety such that flames cannot escape via a mounting hole.

Figure 7:
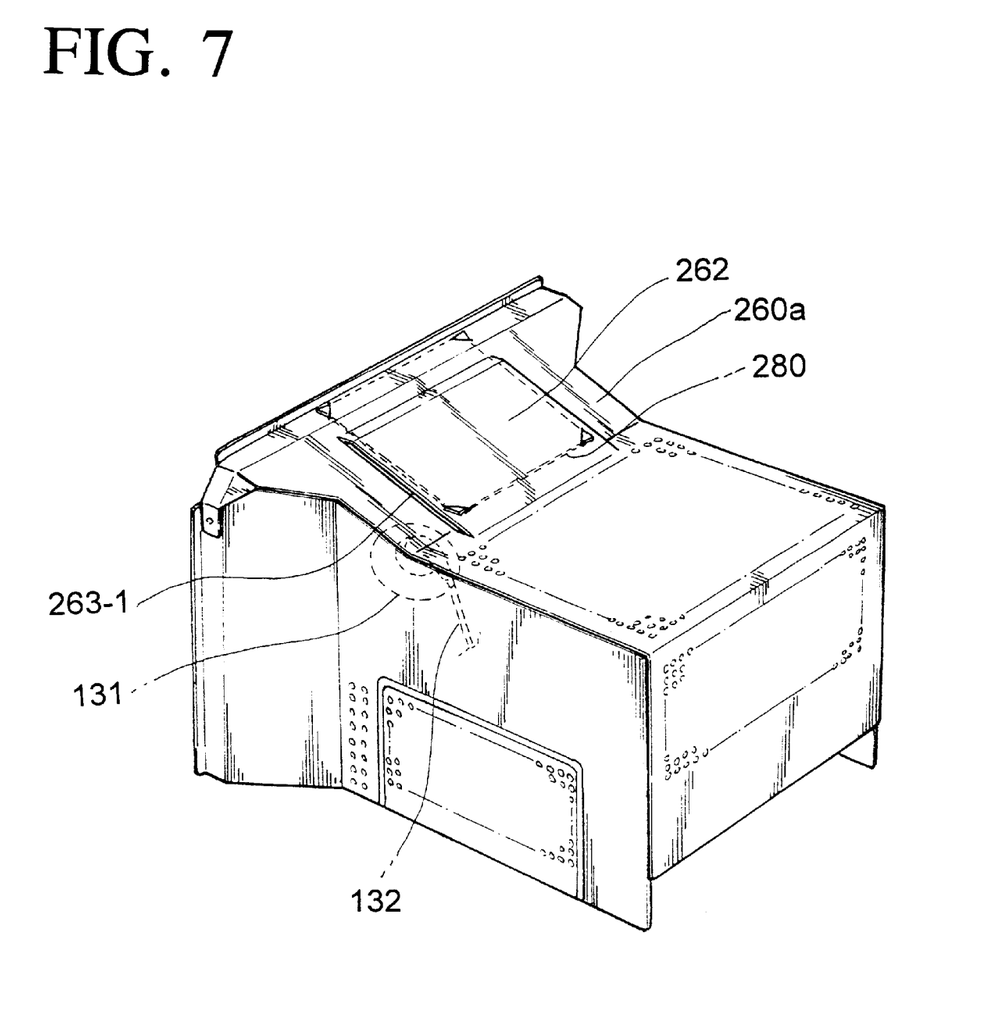
FIG. 7 is a perspective view of a nonflammable and fire-retardant shield case according to a second embodiment of the present invention.

FIG. 7 shows a shield case 260 according to a second embodiment of the present invention. The anode cap shielding 262 is formed on the top plate 260a of the shield case 260. In the shield case 260, the anode cap shielding 262 is formed by protruding upward the part which lies on the center area at the state that both sides are cut out at the top plate 260a. Also, the protruding height of the anode cap shielding 262 may be different according to each product. The reason is that the protruding height is determined according to the specification of the display device.

FIG. 7 shows that the height of the anode cap shielding 162 is a little protruded. Therefore, a through opening 263-1 formed on both sides of the anode cape shielding case 262 can be formed so as not to exceed 1 mm in height. Since in this case the relevant requirements are based on the requirements that are applicable without regard to length in the instance that the height is drilled below 1 mm as specified by UL safety requirements, the above through opening 263-1 does not have the requirements that are forced to be shielded completely by the additional components. However, to be insulated with the anode cap 131 or the anode cable 132, only a nonflammable and fireproof insulation sheet (or member) 280 is installed to be inserted on the lower area of the anode cap shielding 262.

Figure 8:
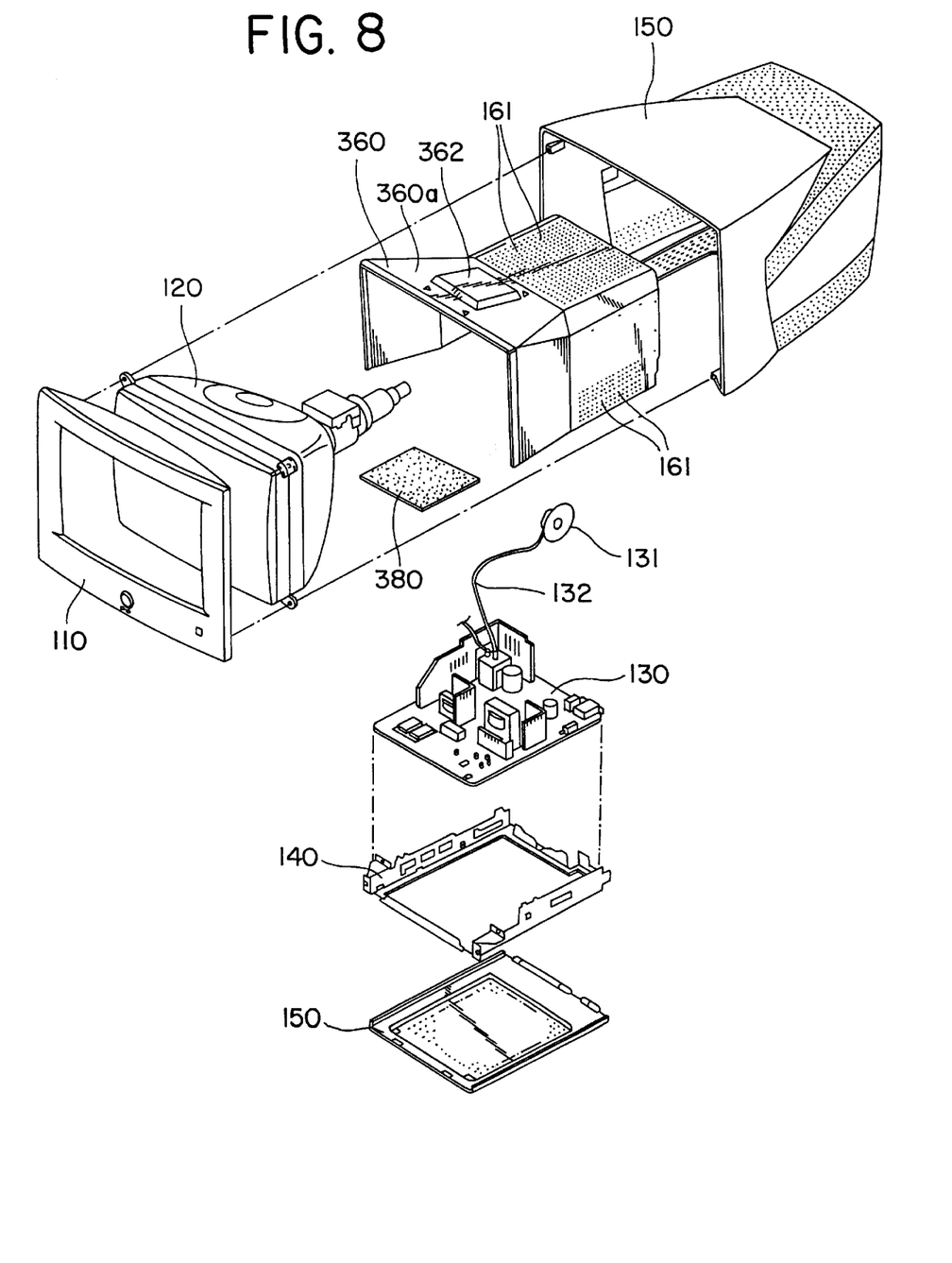
FIG. 8 is a disassembled perspective view of a CRT-type display device according to a third embodiment of the present invention.
Figure 9:
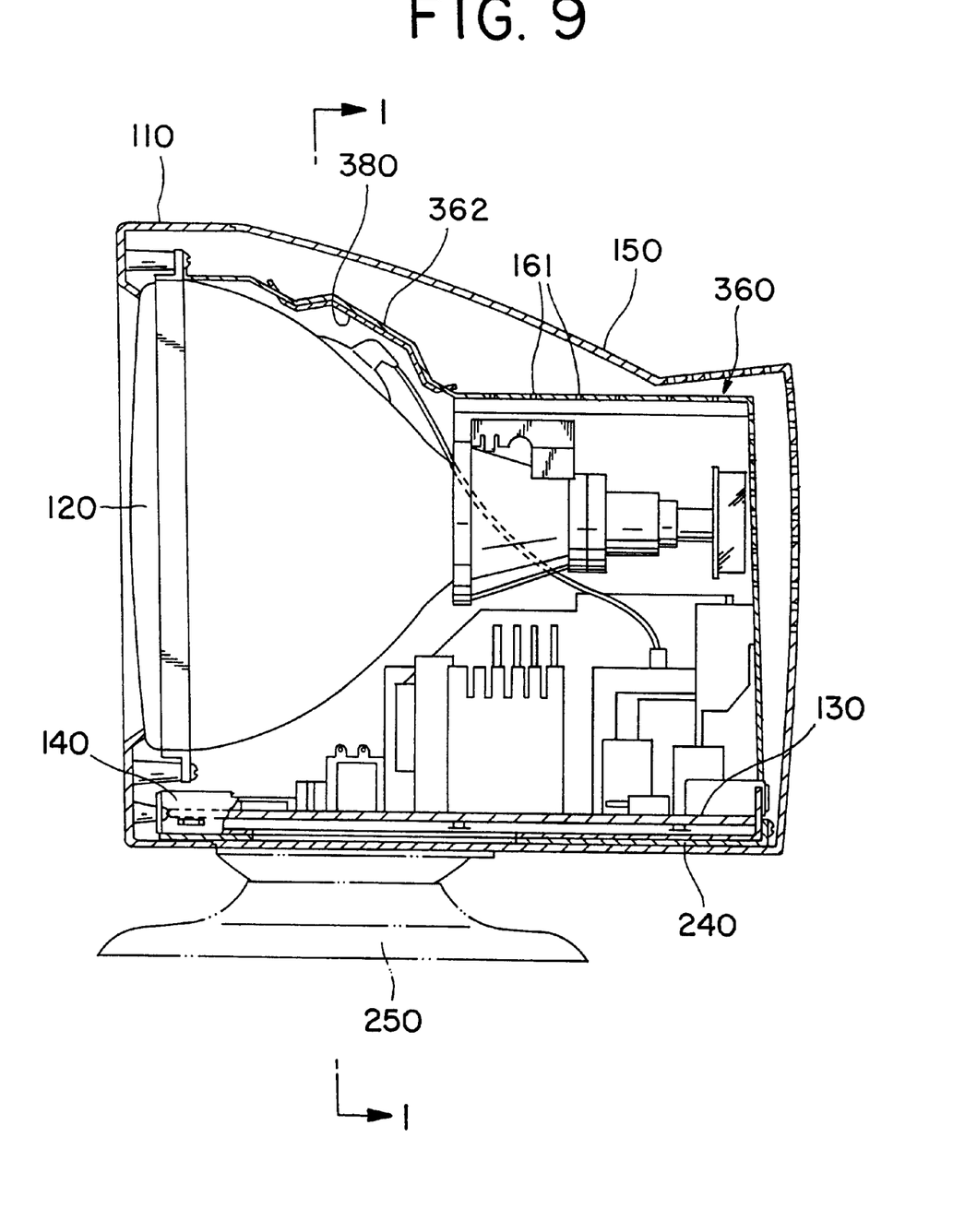
FIG. 9 is a cross-sectional view of the CRT-type display device according to the third embodiment of the present invention.

FIG. 8 shows a disassembled perspective view and FIG. 9 shows a cross-sectional view of a CRT display device according to a third embodiment of the present invention. A shield case 360 is formed so as to have a small protrusion toward an upper side so as to be equipped with an anode cap shielding 362. This anode cap shielding 362 is constituted without forming any holes in the top plate 360a.

Figure 10:
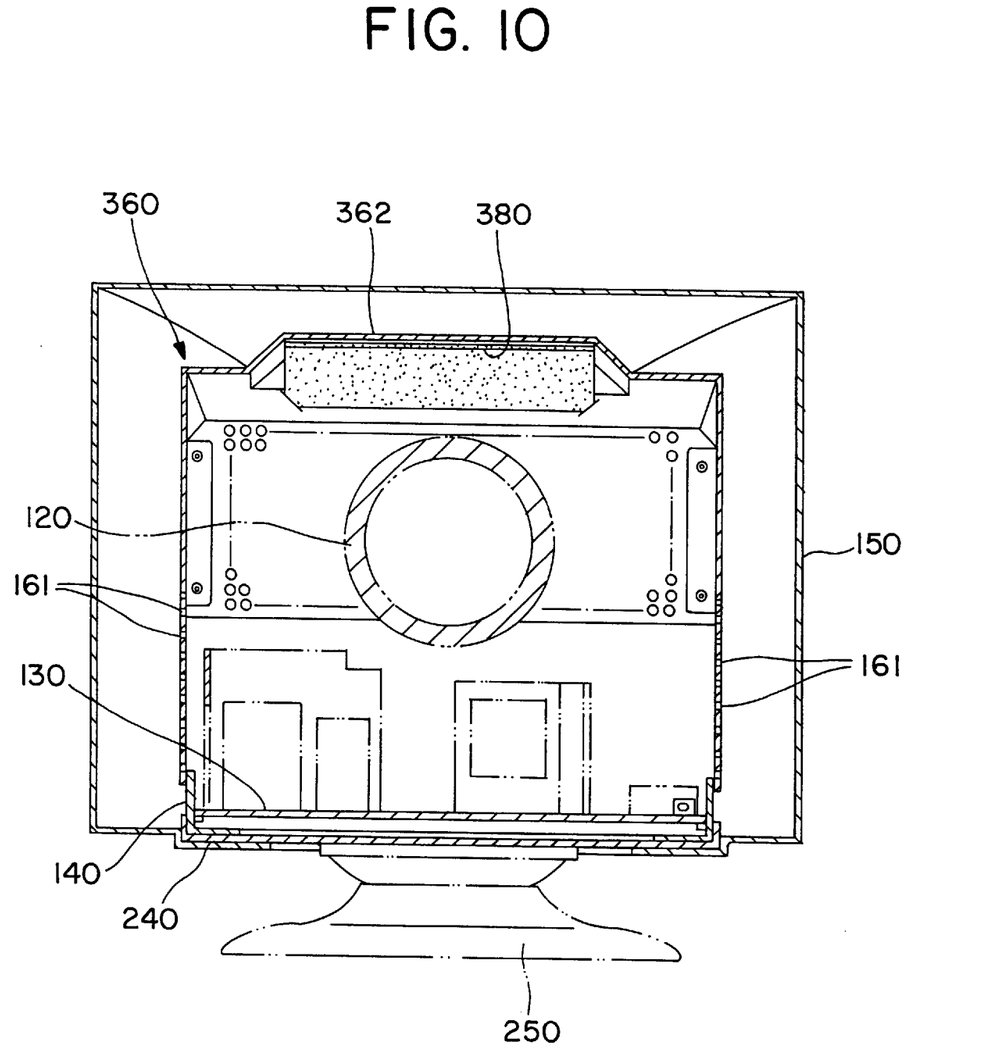
FIG. 10 is a cross-sectional view along line I—I of FIG. 9.

As shown in FIG. 10, which is a view along a line I—I of FIG. 9, the fire cannot escape out through the anode cap shielding 362. Only an insulating sheet 380 is installed on the lower side of the anode cap shielding 362, to prevent the electric leakage from the contact of the anode cap shielding 362 with the anode cap 131 and the anode cable 132, on which high voltage flows. The insulating sheet 380 is made of nonflammable or substantially nonflammable.

According to the above-described embodiments, the present invention provides a CRT-type display device having a shield case which both provides EMI shielding and meets UL safety standards for fire containment. Especially, by adopting the principles of the present invention, fabrication costs of a CRT-type display device can be curtailed by allowing the use of relatively inexpensive material, which may or may not be nonflammable and fire-retardant, because an accidental fire can be contained inside the shield case.

In addition, the present invention can promote the freedom of design, because the external case is not restricted by the UL safety requirements and standards.

Furthermore, the present invention is beneficial environmentally because the use of nonflammable material is reduced and the outer casing of the display device can even be made of used material.

It will be apparent to those skilled in the art that various modifications can be made in the display device having a fire-retardant shield case of the present invention, without departing from the spirit of the invention. Thus, it is intended that the present invention cover such modifications as well as variations thereof, within the scope of the appended claims and their equivalents.

What is claimed is:

1. A display device comprising:

a front case;

a cathode ray tube mounted on said front case;

a main circuit board mounted on a rear side of said cathode ray tube;

a circuit board frame, mounted to said front case, to support said main circuit board;

a nonflammable and fire-retardant shield case encasing said cathode ray tube and said main circuit board, to meet the Underwriter's Laboratories Standard 1418 (1992), Standard for Safety for Cathode Ray Tubes, for fire containment of the display device in order to contain a fire if the fire occurs in an interior of the display device, while providing a shielding effect which minimizes radiation of electromagnetic waves generated by said cathode ray tube and protects said cathode ray tube from external electromagnetic interference; and a rear case to connect with said front case to encase said cathode ray tube, said main circuit board, said circuit board frame and said shield case.

2. The display device as claimed in claim 1, wherein said front case and said rear case are made of a nonfire-retardant material.

3. The display device as claimed in claim 1, wherein said shield case comprises:

a top plate;

first and second lateral plates formed on respective opposite sides of said top plate; and a rear plate forming a rear surface of the top plate and substantially perpendicular to said top plates and said first and second side plates.

4. The display device as claimed in claim 3, wherein a said top plate includes a top surface and an anode cap shield which protrudes upwardly from said top surface by a predetermined height to form openings at respective opposite sides of said anode cap shield.

5. The display device as claimed in claim 4, further comprising a nonflammable and fireproof plate member installed under said anode cap shield and said top plate of said shield case.

6. The display device as claimed in claim 5, wherein said plate member has sides which block the openings formed by said anode cap shield.

7. The display device as claimed in claim 4, further comprising:

an anode cap connected to said cathode ray tube;

an anode cable to pass voltage between said cathode ray tube and said main circuit board via said anode cap; and a nonflammable and fireproof plate member installed adjacent to said anode cap and said anode cable.

8. The display device as defined in claim 1, further comprising a bottom frame mounted under said circuit board frame and having a full-panel construction, to contain the fire in a bottom direction of the display device.

9. The display device of claim 1, wherein said shield case further comprises an anode cap shield protruding from a side of said shield case, said anode cap shield having openings of less than 1 mm.

10. The display device of claim 1, wherein said shield case further comprises an anode cap shield protruding from a side of said shield case without forming openings between the side and said anode cap shield.

11. A device comprising:

a front case;

a cathode ray tube mounted on said front case;

a main circuit board mounted on a rear side of said cathode ray tube;

a circuit board frame, mounted to said front case, to support said main circuit board;

a nonflammable and fire-retardant shield case encasing said cathode ray tube and said main circuit board, to contain a fire if the fire occurs in an interior of the display device, while providing a shielding effect which minimizes radiation of electromagnetic waves generated by said cathode ray tube and protects said cathode ray tube from external electromagnetic interference;

a rear case to connect with said front case to encase said cathode ray tube, said main circuit board, said circuit board frame and said shield case;

protrusions formed on an inner surface of said rear case; and a plurality of case mounting holes formed in a surface of said nonflammable and fire-retardant shield case, corresponding to said protrusions.

12. The display device as defined in claim 11, further comprising a plurality of mounting caps respectively inserted into said case mounting holes of said nonflammable and fire-retardant shield case, each of said plurality of mounting caps having a receptacle to receive the respective protrusion of said rear case.

13. The display device as defined in claim 12, wherein said plurality of mounting caps are made of a nonflammable and fire-retardant material.

14. A display device comprising:

a cathode ray tube;

a main circuit board mounted on a rear side of said cathode ray tube;

a circuit board frame to support said main circuit board;

a nonflammable and fire-retardant shield case as defined in Underwriter's Laboratory Standard 1418 (1992), Standard for Safety for Cathode Ray Tubes, to provide a shielding effect to minimize radiation of electromagnetic waves generated by said cathode ray tube and protects said cathode ray tube from external electromagnetic interference, and to contain a fire if it first occurs at said cathode ray tube or said main circuit board; and an outer case encasing said cathode ray tube, said main circuit board, said main circuit board frame and said shield case.

15. The display device as claimed in claim 14, wherein said outer case is made of nonfire-retardant materials.

16. The display device as claimed in claim 14, further comprising:

a bottom frame having a full-panel construction to support said circuit board frame and to cover a bottom opening of said outer case, to contain the fire in a bottom direction of the display device if the fire occurs at said cathode ray tube or said main circuit board.

17. The display device as claimed in claim 14, wherein said shield case comprises:

a top plate;

first and second lateral plates formed at respective opposite sides of said top plate and substantially perpendicular to said top plate, so that there are no gaps between said top plate and said first and second lateral plates; and a rear plate formed from said top plate and substantially perpendicular to said top plate.

18. The display device as claimed in claim 17, further comprising:

an anode cap connected to said cathode ray tube;

an anode cable to pass voltage between said cathode ray tube and said main circuit board via said anode cap;

said top plate including a top surface and an anode cap shield to receive said anode cap and said anode cable, and protruding upwardly from said top surface by a predetermined height to form openings at respective opposite sides of said anode cap shield; and a nonflammable and fire-retardant plate member having sides which block the openings formed by said anode cap shield.

19. The display device as claimed in claim 18, wherein said plate member is positioned between said anode cap shield and said anode cable, and formed of an insulating material to provide insulation between said anode cap shield and said anode cable.

20. The display device as claimed in claim 17, further comprising:

an anode cap connected to said cathode ray tube;

an anode cable to pass voltage between said cathode ray tube and said main circuit board via said anode cap;

said top plate including a top surface and an anode cap shield to receive said anode cap and said anode cable, and protruding upwardly from said top surface by a predetermined height to form openings at respective opposite sides of said anode cap shield; and a plate member positioned between said anode cap shield and said anode cable, having sides which block the openings formed by said anode cap shield, and formed of an insulating material to provide insulation between said anode cap shield and said anode cable.

21. The display device as claimed in claim 16, wherein: said shield case comprises:
a top plate,
first and second lateral plates formed at respective opposite sides of said top plate and substantially perpendicular to said top plate, so that there are no gaps between said top plate and said first and second lateral plates, and
a rear plate formed from said top plate and substantially perpendicular to said top plate;
the display device further comprising:
an anode cap connected to said cathode ray tube, and
an anode cable to pass voltage between said cathode ray tube and said main circuit board via said anode cap,
said top plate including a top surface and an anode cap shield to receive said anode cap and said anode cable, and protruding upwardly from said top surface by a predetermined height to form openings at respective opposite sides of said anode cap shield, and
a nonflammable and fire-retardant plate member having sides which block the openings formed by said anode cap shield.

22. The display device as claimed in claim 17, further comprising:
an anode cap connected to said cathode ray tube;
an anode cable to pass voltage between said cathode ray tube and said main circuit board via said anode cap;
said top plate including a top surface and an anode cap shield to receive said anode cap and said anode cable, and protruding upwardly from said top surface by less than 1 mm to form openings at respective opposite sides of said anode cap shield.

23. The display device as claimed in claim 22, further comprising a nonflammable and fire-retardant plate member formed between said anode cap shield and said anode cable.

24. The display device as claimed in claim 17, further comprising:
an anode cap connected to said cathode ray tube;
an anode cable to pass voltage between said cathode ray tube and said main circuit board via said anode cap;
said top plate including a top surface and an anode cap shield to receive said anode cap and said anode cable, and protruding upwardly from said top surface by a predetermined height, without forming any openings between said top surface and said anode cap shield.

25. The display device as claimed in claim 24, further comprising:
a nonflammable or substantially non-flammable insulating sheet between said anode cap shield and said anode cable, to provide insulation between said anode cap shield and said anode cable.

26. The display device as claimed in claim 14, wherein: said shield case comprises
a top plate,
first and second lateral plates formed at respective opposite sides of said top plate and substantially perpendicular to said top plate, and
a rear plate formed from said top plate and substantially perpendicular to said top plate;
the display device further comprising
an anode cap connected to said cathode ray tube,
an anode cable to pass voltage between said cathode ray tube and said main circuit board via said anode cap,
said top plate including a top surface and an anode cap shield to receive said anode cap and said anode cable, and protruding upwardly from said top surface by a predetermined height to form openings at respective opposite sides of said anode cap shield, and
a nonflammable and fire-retardant plate member having sides which block the openings formed by said anode cap shield.

27. The display device as claimed in claim 14, wherein: said shield case comprises
a top plate,
first and second lateral plates formed at respective opposite sides of said top plate and substantially perpendicular to said top plate, and
a rear plate formed from said top plate and substantially perpendicular to said top plate;
the display device further comprising
an anode cap connected to said cathode ray tube,
an anode cable to pass voltage between said cathode ray tube and said main circuit board via said anode cap, and
said top plate including a top surface and an anode cap shield to receive said anode cap and said anode cable, and protruding upwardly from said top surface by less than 1 mm to form openings at respective opposite sides of said anode cap shield.

28. The display device as claimed in claim 14, wherein: said shield case comprises
a top plate,
first and second lateral plates formed at respective opposite sides of said top plate and substantially perpendicular to said top plate, and
a rear plate formed from said top plate and substantially perpendicular to said top plate;
the display device further comprising
an anode cap connected to said cathode ray tube,
an anode cable to pass voltage between said cathode ray tube and said main circuit board via said anode cap, and
said top plate including a top surface and an anode cap shield to receive said anode cap and said anode cable, and protruding upwardly from said top surface by a predetermined height, without forming any openings between said top surface and said anode cap shield.

29. A display device comprising:
a cathode ray tube;
a main circuit board mounted on a rear side of said cathode ray tube;
a circuit board frame to support said main circuit board;
a nonflammable and fire-retardant shield case to provide a shielding effect to minimize radiation of electromagnetic waves generated by said cathode ray tube and protects said cathode ray tube from external electromagnetic interference, and to contain a fire if it first occurs at said cathode ray tube or said main circuit board; and an outer case encasing said cathode ray tube, said main circuit board, said main circuit board frame and said shield case, wherein:

said outer case comprises a front case connected to said cathode ray tube, said circuit board frame being mounted to said front case, and a rear case to connect with said front case;

the display device further comprising a plurality of case mounting holes formed in a surface of said shield case, a plurality of mounting caps respectively inserted into said plurality of case mounting holes, each of said plurality of mounting caps having a receptacle, and a plurality of protrusions formed on a surface of said rear case and received by said respective receptacles.

30. The display device as claimed in claim 29, wherein said plurality of mounting caps are made of a nonflammable and fire-retardant material.

31. The display device as claimed in claim 30, wherein the plurality of case mounting holes are of a diameter to not conform with Underwriter's Laboratories Standard 1418 (1992), Standard for Safety for Cathode Ray Tubes, for fire containment, and the insertion of the plurality of mounting caps into the respective plurality of case mounting holes conforms with the Underwriter's Laboratories Standard.

32. The display device as claimed in claim 29, wherein said shield case meets Underwriter's Laboratories Standard 1418 (1992), Standard for Safety for Cathode Ray Tubes for fire containment of the display device.

33. A display device comprising:

a front case;

electrical components to provide a display and which emit electromagnetic waves and is affected by external electromagnetic interference;

a nonflammable and fire-retardant shield case encasing said electrical components and compliant with Underwriter's Laboratories Standard 1418 (1992), Standard for Safety for Cathode Ray Tubes, to contain a fire if the fire occurs at said electrical components, while providing a shielding effect which minimizes radiation of the electromagnetic waves generated by said electrical components and protects said electrical components from the external electromagnetic interference; and a rear case to connect with said front case to encase said electrical components and said shield case.

34. The display device of claim 33, wherein said shield case further comprises an anode cap shield protruding from a side of said shield case, said anode cap shield having openings of less than 1 mm.

35. The display device of claim 33, wherein said shield case further comprises an anode cap shield protruding from a side of said shield case without forming openings between the side and said anode cap shield.

36. The display device of claim 33, wherein a rear of said shield case is mounted to an inner side of said rear case.

* * * * *

UNITED STATES PATENT AND TRADEMARK OFFICE
CERTIFICATE OF CORRECTION

PATENT NO.    : 6,288,759 B1
DATED         : September 11, 2001
INVENTOR(S)   : Nam-il Cho et al.

It is certified that error appears in the above-identified patent and that said Letters Patent is hereby corrected as shown below:

Title page,
Item [30], Foreign Applications,
Change "Mar. 2, 1998" to -- Mar. 20, 1998 --;

Column 7,
Line 38, after "A" insert -- display --.

Signed and Sealed this

Twenty-sixth Day of March, 2002

*Attest:*

JAMES E. ROGAN
*Attesting Officer*     *Director of the United States Patent and Trademark Office*